United States Patent [19]

Mercer

[11] 4,043,720
[45] Aug. 23, 1977

[54] DEVICE FOR ADJUSTING STRAND CARRIER TUBE IN COMPOSITE YARN PRODUCING APPARATUS

[75] Inventor: Howard Alexander Mercer, Asheville, N.C.

[73] Assignee: Akzona Incorporated, Asheville, N.C.

[21] Appl. No.: 595,000

[22] Filed: July 11, 1975

[51] Int. Cl.² .............................................. B29F 3/10
[52] U.S. Cl. ................................. 425/113; 425/381; 425/466
[58] Field of Search .............. 72/264, 265; 425/113, 425/114, 381, 466; 403/43, 44, 47; 264/209, 176 R; 287/60

[56] References Cited

U.S. PATENT DOCUMENTS

| 1,359,391 | 11/1920 | Landymore et al. | 403/44 X |
| 2,465,482 | 3/1949 | Rhodes | 425/381 X |
| 2,591,508 | 4/1952 | Brown | 425/381 X |
| 3,147,515 | 9/1964 | Amsden | 425/381 |
| 3,306,633 | 2/1967 | Haake | 403/44 X |
| 3,538,547 | 11/1970 | Drabb | 425/113 |
| 3,752,614 | 8/1973 | Bremer | 425/113 |
| 3,773,449 | 11/1973 | Hager | 425/466 X |

Primary Examiner—Francis S. Husar
Assistant Examiner—Mark Rosenbaum
Attorney, Agent, or Firm—Francis W. Young; Tom R. Vestal

[57] ABSTRACT

In producing a composite yarn which includes a carrier strand and a layer of tacky polymer, provision is made for adjusting the position of a tube through which the carrier strand passes in relation to a polymer extrusion orifice to vary the annular thickness of the polymer layer.

5 Claims, 2 Drawing Figures

DEVICE FOR ADJUSTING STRAND CARRIER TUBE IN COMPOSITE YARN PRODUCING APPARATUS

BACKGROUND OF THE INVENTION

This invention relates to a device for adjusting the position of the tube through which a carrier strand passes before being coated with molten polymer in one operation in the production of a composite yarn. The tube acts as the male die and the polymer extrusion orifice functions as a female die; together the dies define an annular space through which the coating polymer passes.

Two variables which can be controlled during application of the coating polymer to the carrier strand in production of a composite yarn are carrier strand velocity, and melted polymer extrusion rate or quantity of resin extruded per unit time. The velocity, however, of the polymer being applied to the carrier strand is not entirely a function of the extrusion rate, but is also affected by the area of the annular space between the carrier tube and the extrusion orifice.

During operation of a machine, in producing a variety of composite yarns, a severe problem became evident. During apparently satisfactory operation, the molten polymer being applied to coat the moving carrier strand would suddenly fail to adhere to the strand. Apparently the velocity of the molten polymer being applied, compared to the velocity of the carrier strand, was at a critical point, and a slight change in running conditions caused the polymer coating to break loose. The polymer, being extruded continuously, would accumulate at the extrusion orifice. After a short interval of time, the accumulated polymer would break loose and jam the mechanism of the machine. Of course, the accumulation or "slug" of polymer, preceded and followed by bare sections of the carrier strand, interrupted the production of satisfactory quality yarn.

In order to correct this type of misoperation, it has been found to be essential that the velocity of the molten polymer being applied to the carrier strand be controllable. This may be accomplished by adjusting the annular space between the tube through which the carrier strand passes and the polymer extrusion orifice, as by having one end of the carrier tube cone shaped and placed concentrically within a funnel shaped die orifice so that movement of one end of the carrier tube from inside the die toward the strand exit reduces the annular space between the tube and the extrusion orifice. Small vertical movement increments can result in proportionally large annular space changes.

SUMMARY OF THE INVENTION

This invention comprises a support which permits adjusting a strand carrier tube longitudinally in very small increments by means of a rotatable fitting with screw threads on one or both ends. The threads may be of different pitch or of right or left hand. One end of the fitting may screw into a movable block and the other end may screw into a support block which is attached to an extruder die housing. The movable block may travel along a guide which is part of the support block and which prevents rotation of the movable block. The strand carrier tube passes through the movable block, the center of the rotatable fitting, and through the support block into the extruder die housing. The tube may be attached to the movable block by conventional means. As the fitting is rotated, the movable block and tube move in a direction along the tube axis by an amount which may be determined by the differential in the pitch or hand between the screw threads. By this means a relatively small and precisely controlled axial movement of the yarn carrier tube may be obtained by rotation of the fitting.

DESCRIPTION OF THE PREFERRED EMBODIMENTS

Figure 1:
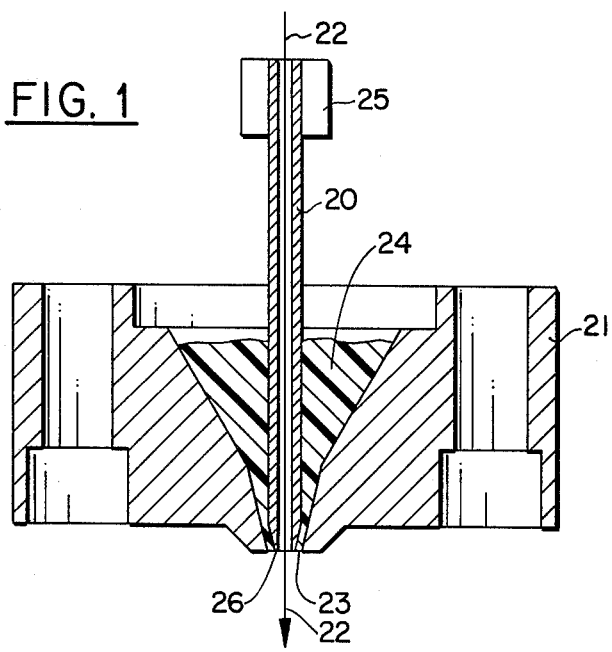
FIG. 1 is a schematic drawing of a cross section of an extruder die orifice and the end of a strand carrier tube.

In FIG. 1 a possible positioning of the end of the hollow strand carrier tube 20 coaxially in the extruder die orifice 23 is shown to illustrate the method by which the longitudinal movement of the guide tube controls the flow of the polymer 24 at the die orifice. The carrier strand 22 is passed through the carrier tube 20 which is axially movable longitudinally along the path of the strand travel in relation to the die head 21 by means of the adjusting device 25. The end 26 of the carrier tube 20 is cone shaped or tapered to a smaller diameter than the main body of the tube. The orifice 23 is funnel shaped, with the smallest area at the exit. The external diameter of the carrier tube 20 may be the same as the internal diameter of the die orifice exit 23, so that the annular area between the orifice 23 and the carrier tube 20 can be adjusted from closed at the lowest position of the carrier tube, to increasing areas as the carrier tube 20 is moved away from the die orifice 23. The total length of adjustment of the carrier tube 20 is about 0.3 inch.

Figure 2:
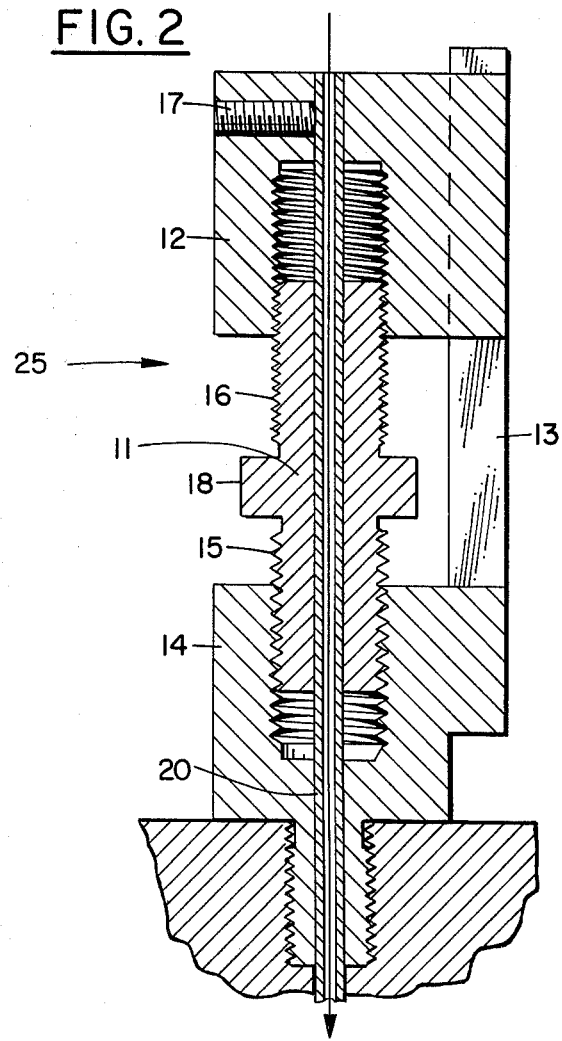
FIG. 2 is a sectional side elevation of the device for adjusting the longitudinal position of a strand carrier tube.

The adjusting device 25 is shown in more detail in FIG. 2. The carrier strand tube 20 is attached by means of a set screw 17 or any other suitable fastener to a movable block 12. The movable block 12 slides toward and away from a support block 14 along a guide 13 which forms an extension of the support block 14. The carrier tube 20 passes concentrically through but is not attached to the support block. The carrier tube 20 also passes through but is not attached to a rotatable fitting 11, which is positioned between the movable block 12 and the support block 14. The fitting 11 may have male screw threads 15, 16 on one or both ends and a center section 18 designed to be turned by use of tools or by hand. The ends of fitting 11 engage respectively with threaded openings in the movable support 12 and in the support block 14. The design of the threads 15, 16 on the two ends of the fitting 11 may be in any manner desired, to obtain an extremely small movement of the tube 20 longitudinally within a given rotation of the fitting, or a relatively larger movement.

The threads 15 may have different pitch than the threads 16 to cause the movable support 12 to shift relatively to support block 14 upon rotation of the fitting 11. Alternatively, the hand of threads 15 may be reversed from that of threads 16. Or, one end of the fitting 11 may be provided with a shoulder or other locking means to permit rotation relative to a block 12 or 14 while preventing separation, so that the opposite threaded end of the fitting can produce the desired movement to the strand carrier tube 20 when the fitting is rotated. By use of this device, very small increments of change in the annular space between the guide tube and the annular spacing of the tube end and die orifice can be effected.

As to a specific example of one design of the rotatable fitting 11 to achieve a desired result, one end 15 of the fitting may have ½ inch - 16 R.H. threads/inch, while the other end 16 may have ½ inch - 20 R.H. threads/inch. One revolution will then move the fitting 1/16 inch in relation to the support block and extruder head, and move the movable block and carrier tube 1/20 inch in the opposite direction. The movable block and carrier tube will, therefore, move 1/80 inch in relation to the support block and extruder head per 360° of the fitting. The difference in pitch or hand should be selected so that strand carrier tube 20 travels no more than about 0.02 inch for each revolution of the rotatable fitting 11.

In an alternative embodiment, the positioning of the carrier tube may be ascertained through use of vernier scales similar to that found on conventional micrometers. A linear scale with coarse graduations may be attached to the support block or other stationary means and a circular scale may be attached to the fitting for finer graduated readings within the coarse linear graduations on the linear scale. Alternatively, a coarse linear scale may be attached to the movable block 12 of FIG. 2 and a linear vernier scale attached to guide 13 adjacent the coarse scale on block 12. The strand carrier tube may then be calibrated by positioning the carrier tube end flush with the die opening and adjusting the graduations and set screw 17 on FIG. 2 to the desired position.

I claim:

1. In an apparatus for forming a composite yarn comprising a carrier strand having an extruded polymer coating thereon, wherein the carrier strand is passed through a carrier tube positioned in a polymer extrusion die housing, said carrier tube functioning as a male die member to form an annular extrusion opening in the die housing, the improvement comprising: a support block attached to said die housing concentric with and surrounding a lower section of said carrier strand tube to thereby form a first channel, a portion of said first channel non-adjacent said die housing being spaced from said carrier tube and having a first pitch female screw thread; a longitudinally movable block concentric with, surrounding, and attached to an upper section of said carrier tube in spaced relationship to said support block; said movable block having a second channel concentric with and facing toward the first channel of said support block, a portion of said second channel being spaced from said carrier tube and having a second pitch female screw thread different from the first pitch screw thread facing axially toward the first pitch female screw thread of said support block and concentric with said carrier tube; means operatively associated with said movable block for preventing rotation of said movable block relative to said support block; and a longitudinal fitting concentric with and rotatable with respect to said carrier tube and interposed between said support block and said movable block, said longitudinal fitting having first and second pitch male screw threads mating respectively with the first and second pitch female screw threads so that rotation of the longitudinal fitting imparts relative movement between the movable block and the support block and between the carrier tube and the opening in the die housing as a function of the difference in pitch between the first and second screw threads.

2. The composite yarn forming apparatus of claim 1 wherein said means for preventing rotation of the movable block relative to said support block comprises a fixed longitudinal guide member attached to said support block and a channel in said movable block for receiving said fixed longitudinal guide member.

3. The composite yarn forming apparatus of claim 2 wherein the pitch of said first screw thread is one inch per 16 threads and the pitch of said second screw thread is one inch per 20 threads.

4. In an apparatus for forming a composite yarn comprising a carrier strand having an extruded polymer coating thereon, wherein the carrier strand is passed through a carrier tube positioned in a polymer extrusion housing, said carrier tube functioning as a male die member to form an annular extrusion opening in the die housing, the improvement comprising: a support block attached to said die housing, said support block having a first cylindrical cavity with an axis parallel to said carrier yarn tube, the first cavity having a first pitch screw thread at least part-way along the wall of the first cavity; a movable block attached to said carrier tube and having a second cylindrical cavity with a second pitch screw thread along at least a portion of the wall of said second wall cavity; a longitudinal fitting having corresponding first and second pitch male screw threads interposed between said support and movable blocks; and means operatively associated with said movable block for preventing rotation of said movable block relative to said support block whereby rotation of said fitting imparts a longitudinal movement to said movable block and carrier tube as a function of the difference in pitch of said first and second screw threads.

5. The apparatus of claim 1 wherein the first pitch screw threads are of a different hand then the second pitch screw threads.

* * * * *